(12) United States Patent
Palmer et al.

(10) Patent No.: US 7,584,023 B1
(45) Date of Patent: Sep. 1, 2009

(54) ELECTRONIC IRRIGATION SYSTEM SOFTWARE

(75) Inventors: Doug Palmer, Redlands, CA (US);
Dana R. Lonn, Minneapolis, MN (US);
Paul Standerfer, Claremont, CA (US);
David Stucke, Diamond Bar, CA (US);
James T. Wright, III, Moreno Valley, CA (US); Russ Huffman, Phoenix, AZ (US); Steven M. Calde, Sherwood, OR (US); Nathan J. Fortin, Alameda, CA (US); Christopher Douglas Weeldreyer, San Carlos, CA (US)

(73) Assignee: The Toro Company, Bloomington, MN (US)

( * ) Notice: Subject to any disclaimer, the term of this patent is extended or adjusted under 35 U.S.C. 154(b) by 208 days.

(21) Appl. No.: 11/674,107

(22) Filed: Feb. 12, 2007

Related U.S. Application Data (60) Provisional application No. 60/772,042, filed on Feb. 10, 2006.

(51) Int. Cl.
G05B 11/01 (2006.01)
G05B 15/00 (2006.01)
G05D 11/00 (2006.01)
A01G 27/00 (2006.01)
B05B 3/00 (2006.01)

(52) U.S. Cl. .................... 700/284; 700/17; 700/83; 239/69; 239/70; 239/99

(58) Field of Classification Search ............ 700/17, 700/83, 284; 239/69, 70, 99
See application file for complete search history.

(56) References Cited

U.S. PATENT DOCUMENTS

| | | | |
|---|---|---|---|
| 4,165,532 A | 8/1979 | Kendall et al. | |
| 4,184,880 A * | 1/1980 | Huber et al. | 106/15.05 |
| 4,209,131 A | 6/1980 | Barash et al. | |
| 4,244,022 A | 1/1981 | Kendall | |
| 4,304,989 A | 12/1981 | Vos et al. | |
| 4,522,338 A * | 6/1985 | Williams | 239/729 |
| 4,569,020 A | 2/1986 | Snoddy et al. | |
| 4,626,984 A | 12/1986 | Unruh et al. | |
| 4,646,224 A | 2/1987 | Ransburg et al. | |
| 4,827,155 A | 5/1989 | Firebaugh | |
| 4,852,051 A | 7/1989 | Mylne, III | |
| 5,038,268 A | 8/1991 | Krause et al. | |
| 5,251,153 A | 10/1993 | Nielsen et al. | |
| 5,278,749 A | 1/1994 | De Man | |
| 5,331,619 A | 7/1994 | Barnum et al. | |
| 5,363,290 A | 11/1994 | Doup et al. | |
| 5,444,611 A | 8/1995 | Woytowitz et al. | |
| 5,458,048 A | 10/1995 | Hohner | |
| 5,742,500 A | 4/1998 | Irvin | |
| 5,746,250 A | 5/1998 | Wick | |
| 5,921,280 A | 7/1999 | Erickson et al. | |
| 5,956,248 A | 9/1999 | Williams et al. | |
| 6,073,110 A | 6/2000 | Rhodes et al. | |
| 6,088,621 A * | 7/2000 | Woytowitz et al. | 700/16 |
| 6,098,898 A | 8/2000 | Storch | |
| 6,102,061 A | 8/2000 | Addink | |

(Continued)

Primary Examiner—Ronald D Hartman, Jr.
(74) Attorney, Agent, or Firm—Inskeep IP Group, Inc.

(57) ABSTRACT

In one embodiment, the present invention includes irrigation control software for a computer that interacts with the features of a plurality of advanced sprinklers, environmental sensors, and other available data. The irrigation control software provides a graphical user interface to create a more efficient irrigation scheduling control interface.

20 Claims, 8 Drawing Sheets

U.S. PATENT DOCUMENTS

| | | |
|---|---|---|
| 6,259,970 B1 | 7/2001 | Brundisini |
| 6,298,285 B1 | 10/2001 | Addink et al. |
| 6,313,852 B1 | 11/2001 | Ishizaki et al. |
| 6,490,505 B1 | 12/2002 | Simon et al. |
| 6,535,771 B1 | 3/2003 | Kussel |
| 6,694,195 B1 | 2/2004 | Garcia |
| 6,823,239 B2 * | 11/2004 | Sieminski ................... 700/284 |
| 7,003,357 B1 * | 2/2006 | Kreikemeier et al. ......... 700/17 |
| 7,010,395 B1 | 3/2006 | Goldberg et al. |
| 7,051,952 B2 * | 5/2006 | Drechsel ..................... 239/256 |
| 7,058,479 B2 * | 6/2006 | Miller ........................ 700/284 |
| 7,090,146 B1 * | 8/2006 | Ericksen et al. ............. 239/200 |
| 7,203,576 B1 * | 4/2007 | Wilson et al. ............... 700/284 |
| 2002/0100814 A1 * | 8/2002 | Pollak et al. .................. 239/63 |
| 2006/0027677 A1 * | 2/2006 | Abts ........................... 239/67 |
| 2006/0178781 A1 * | 8/2006 | Simon et al. ................ 700/282 |
| 2006/0293797 A1 * | 12/2006 | Weiler ........................ 700/284 |

* cited by examiner

ELECTRONIC IRRIGATION SYSTEM SOFTWARE

RELATED APPLICATIONS

This application claims priority to U.S. Provisional Application Ser. No. 60/772,042 filed Feb. 10, 2006 entitled Electronic Irrigation System Software and is hereby incorporated by reference.

BACKGROUND OF THE INVENTION

Sprinkler systems for turf irrigation are well known. Typical systems include a plurality of valves and sprinkler heads in fluid communication with a water source, and a centralized controller connected to the water valves. At appropriate times the controller opens the normally closed valves to allow water to flow from the water source to the sprinkler heads. Water then issues from the sprinkler heads in a predetermined fashion.

There are many different types of sprinkler heads, including above-the-ground heads and "pop-up" heads. Pop-up sprinklers, though generally more complicated and expensive than other types of sprinklers, are thought to be superior. There are several reasons for this. For example, a pop-up sprinkler's nozzle opening is typically covered when the sprinkler is not in use and is therefore less likely to be partially or completely plugged by debris or insects. Also, when not being used, a pop-up sprinkler is entirely below the surface and out of the way.

The typical pop-up sprinkler head includes a stationary body and a "riser" which extends vertically upward, or "pops up," when water is allowed to flow to the sprinkler. The riser is in the nature of a hollow tube which supports a nozzle at its upper end. When the normally-closed valve associated with a sprinkler opens to allow water to flow to the sprinkler, two things happen: (i) water pressure pushes against the riser to move it from its retracted to its fully extended position, and (ii) water flows axially upward through the riser, and the nozzle receives the axial flow from the riser and turns it radially to create a radial stream. A spring or other type of resilient element is interposed between the body and the riser to continuously urge the riser toward its retracted, subsurface, position, so that when water pressure is removed the riser assembly will immediately return to its retracted position.

The riser assembly of a pop-up or above-the-ground sprinkler head can remain rotationally stationary or can include a portion that rotates in continuous or oscillatory fashion to water a circular or partly circular area, respectively. More specifically, the riser of the typical rotary sprinkler includes a first portion (e.g. the riser), which does not rotate, and a second portion, (e.g. the nozzle assembly) which rotates relative to the first (non-rotating) portion.

The rotating portion of a rotary sprinkler riser typically carries a nozzle at its uppermost end. The nozzle throws at least one water stream outwardly to one side of the nozzle assembly. As the nozzle assembly rotates, the water stream travels or sweeps over the ground.

The non-rotating portion of a rotary sprinkler riser assembly typically includes a drive mechanism for rotating the nozzle. The drive mechanism generally includes a turbine and a transmission. The turbine is usually made with a series of angular vanes on a central rotating shaft that is actuated by a flow of fluid subject to pressure. The transmission consists of a reduction gear train that converts rotation of the turbine to rotation of the nozzle assembly at a speed slower than the speed of rotation of the turbine.

During use, as the initial inrush and pressurization of water enters the riser, it strikes against the vanes of the turbine causing rotation of the turbine and, in particular, the turbine shaft. Rotation of the turbine shaft, which extends into the drive housing, drives the reduction gear train that causes rotation of an output shaft located at the other end of the drive housing. Because the output shaft is attached to the nozzle assembly, the nozzle assembly is thereby rotated, but at a reduced speed that is determined by the amount of the reduction provided by the reduction gear train.

Alternatively, the drive mechanism may include a stepper motor coupled to the transmission in place of the turbine. Unlike the turbine, a stepper motor provides a constant rotational drive source which is easily electrically controlled. However, such a stepper motor is located within the sprinkler body, and typically is positioned within the water flow path in the riser. Consequently, the motor housing and the related wires protruding from the housing must be waterproofed to prevent water related motor malfunction.

Further, sprinklers (including a motorized sprinkler) typically rely on mechanical watering arc adjustments located on the sprinkler to control which areas a sprinkler head rotates through when watering. Consequently, a user must mechanically set each arc adjustment at each sprinkler location. Since an irrigation system may have many sprinklers, determining and setting individual sprinkler arcs at each sprinkler site can consume a large amount of time, especially if the irrigation system is installed over a large area such as a golf course.

Another feature of many prior art sprinklers is the use of electrically actuated pilot valves which connect inline with the irrigation water supply and a sprinkler, allowing the water flow to an individual sprinkler to be turned on or off, preferably from a distant central control system. Typically, these pilot valves are located partially or even completely outside the sprinkler body. Thus, when the pilot valve needs adjustment or replacement, a user must shut off the water supply leading to the pilot valve, dig around the sprinkler to find the pilot valve, replace the pilot valve, rebury it, and then turn the water supply back on. Since the main water supply must be shut off, other sprinklers will not function during this time-consuming repair and may interrupt preprogrammed watering cycles.

Although the prior art sprinklers discussed above have been known to operate with general satisfaction, there is always a need to pursue improvements. For example, prior art sprinklers do not always provide the desired accuracy in rotating the nozzle. Nor do they typically offer easy ways to maintain or repair the sprinkler. Nor do they offer the user a way to remotely control or remotely reconfigure the sprinkler. In these and other respects, therefore, the prior art sprinklers are known to have substantive limitations.

Irrigation systems with a large number of sprinklers require a central controller unit that determines the irrigation schedule for groups of sprinklers within the irrigation system. Typically, the irrigation schedule is set by the user and can be further programmed to interrupt watering based preset thresholds of sensor data. For example, a user may program an irrigation schedule to be interrupted when the soil moisture in a certain area reaches a certain value or if the water pressure in the irrigation piping drops below a specified level.

However, these irrigation controllers lack considerable operational and programming flexibility, causing long programming time and limited system functionality. For example, some irrigation controllers provide arbitrary and confusing identification schemes to refer to a sprinkler or group of sprinklers. Other systems provide confusing, text-based programming interfaces which require significant time and attention to program. In any case, the performance of the Irrigation controllers are limited by the functionality of the sprinklers they control, which is typically only a watering or non-watering state.

What is needed is a sprinkler control system that can better manage a large irrigation system. What is also needed is a sprinkler control system that can better manage next generation sprinklers, such as those seen in the U.S. application Ser. No. 11/303,328 entitled Sprinkler Assembly, filed on Dec. 15, 2005, the contents of which are hereby incorporated by reference.

OBJECTS AND SUMMARY OF THE INVENTION

It is an object of the present invention to overcome the limitations of the prior art.

It is a further object of the present invention to provide an irrigation controller that allows a user to more easily setup an irrigation program.

It is another object of the present invention to provide an irrigation controller that better utilizes advanced features of next generation sprinklers.

The present invention attempts to achieve these objects, in one embodiment, by providing irrigation control software for a computer that interacts with the features of a plurality of advanced sprinklers, environmental sensors, and other inputted data. The irrigation control software provides a graphical user interface to create a more efficient irrigation scheduling control interface.

DETAILED DESCRIPTION OF THE INVENTION

Figure 1:
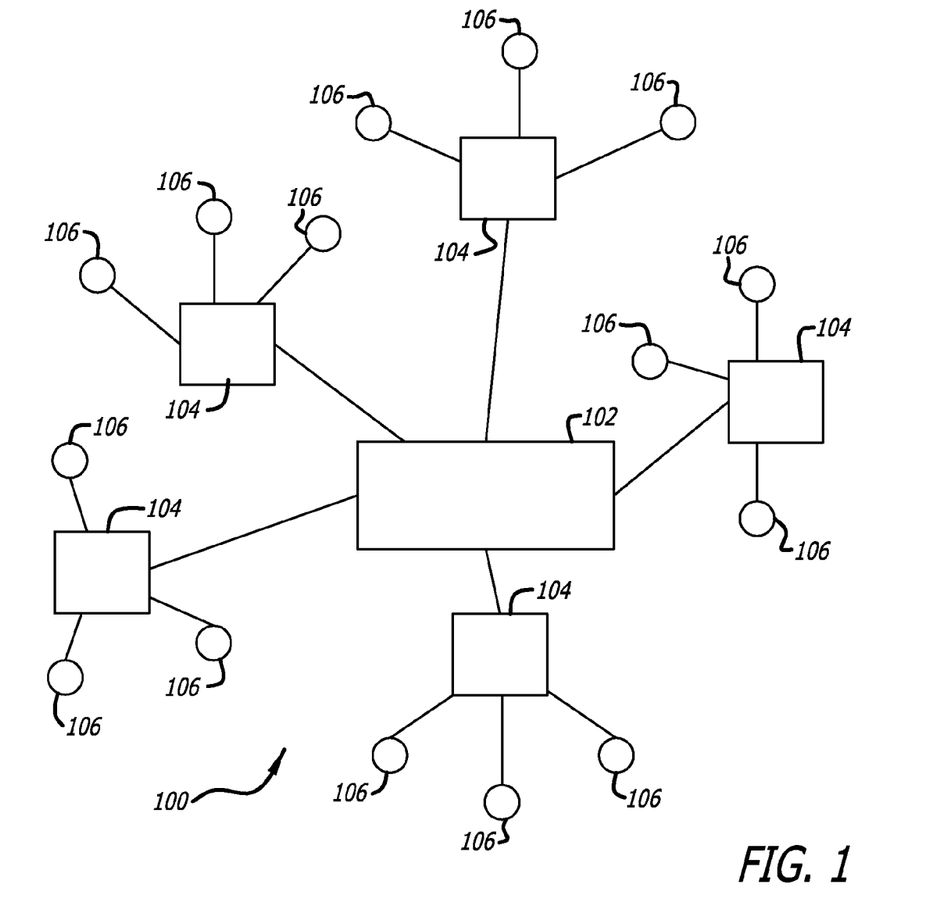
FIG. 1 illustrates a diagram of an irrigation system according to the present invention.

FIG. 1 illustrates an example irrigation system 100 according to the present invention in which a central computer 102 communicates with and controls a plurality of satellite controllers 104 and sprinklers 106. As described in further detail below, the central computer 102 executes irrigation control software that creates irrigation schedules, monitors various components of the irrigation system 100, and otherwise controls the components of the irrigation system 100.

Any sprinkler type or model can be operated with the software of the central computer 102; however, more sophisticated sprinklers are preferred since they can provide the user with additional control and feedback options. An example sprinkler with preferred functionality can be seen in the U.S. application Ser. No. 11/303,328 entitled Sprinkler Assembly, filed on Dec. 15, 2005, the contents of which are incorporated by reference.

More specifically, the satellite controllers 104 of the present invention include communication circuit boards that support communication protocols of more conventional electric solenoid interfaces of 24 VAC at 1 amp, as well as more complicated communications protocols that support power line communication for operational control of the irrigation sprinkler 106 as described in this specification.

Figure 2:
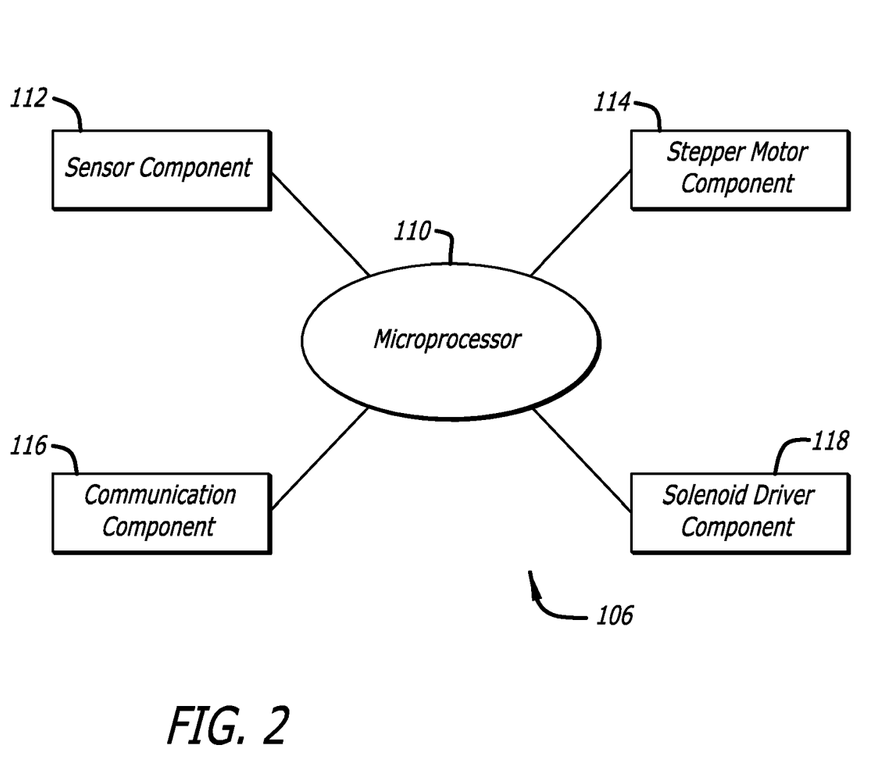
FIG. 2 illustrates a component diagram of an irrigation sprinkler according to the present invention.

As illustrated in FIG. 2, a preferred sprinkler 106 according to the present invention includes a microprocessor 100 that controls the various electrical components conceptually illustrated in the figure. For example, these components may include a stepper motor component 114 which controls the rotation of a nozzle base (the portion of the sprinkler containing the sprinkler nozzle), a solenoid driver component 118 which actuates a valve inside the sprinkler 106 to begin or end irrigation, a sensor component 112 which senses the nozzle position (rotational position and horizontal position), and a communication component 116 that sends and receives data between the central computer 102, satellite controller 104, or even other sprinklers 106.

In operation for example, command signals from either the central computer 102 or the satellite controller 104 are addressed to a specific sprinkler 106 and received by the sprinkler's communication component 116. The microprocessor 110 then processes the commands and actuates the appropriate component. For example, a watering command may cause the microprocessor 110 to activate the solenoid driver component 118 to open the internal water valve, causing the nozzle base to rise from the sprinkler body and water to exit the nozzle. The microprocessor 110 may simultaneously send watering arc control data to the stepper motor component, determining the specific arc and rotation speed that the stepper motor should move the nozzle through. The microprocessor 110 may also simultaneously interrogate the sensor component for data on the position of the nozzle base (e.g. the vertical position, the rotation position, or the rotational speed). Thus, the sprinkler 106 can execute received irrigation commands that are sent to it and optionally transmit sensor feedback back to the central controller 102 (e.g., did the sprinkler popup, did the sprinkler rotate, how long did the sprinkler run, how many cycles or rotations through the desired arc did the sprinkler make, what was the water pressure at the sprinkler, wat was the flow at the sprinkler, etc.).

Irrigation Software

Turning now to the irrigation software, FIGS. 3-11 illustrate various aspects according to the present invention. Generally speaking, the irrigation software provides a graphical user interface for the user to monitor, manage, and control a large irrigation system. Preferably, the software provides various graphical representations of the specified irrigation area to communicate information about the irrigation system quickly and efficiently while providing an intuitive irrigation control interface.

Figure 3:
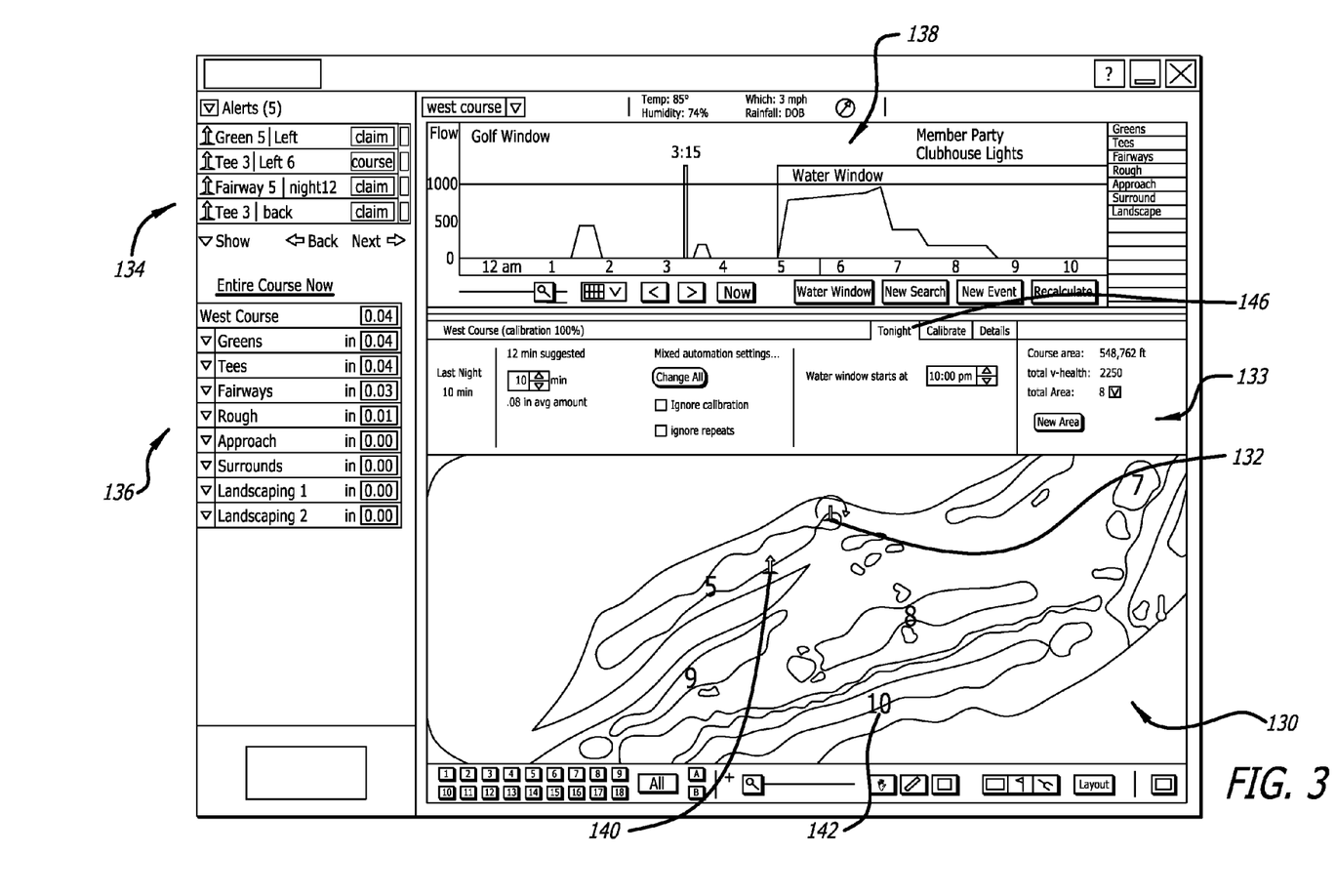
FIG. 3 illustrates a view of a main graphical user interface according to the present invention.

FIG. 3 illustrates an example screen layout of the irrigation software according to the present invention. In this view, the software shows an alert area 134, a selector area 136, a chart area 138, a control area 133, and a map area 130, as described in greater detail below.

Map Area

The map area 130 displays a map of the specified watering area of the irrigation system. In the present example, the specified area is a golf course. In addition to the geographic layout of the specified watering area, the map area 130 also shows the relative positions of sprinklers 106 within the golf course in the form of information-bearing icons. These icons can, not only communicate the sprinkler position to the user, but also display relevant operation data, especially sensor data from the sprinkler itself. For example, icon 132 is in the shape of a sprinkler with a raised nozzle base and a circular arrow to denote that the sensors of the sprinkler 106 have determined that the nozzle base is in a raised position and is watering its specified area. In another example, icon 140 shows a lowered sprinkler shape with an upward arrow to convey that the sprinkler sensor data indicates the nozzle base is rising to begin a watering cycle.

The map area 130 also includes region numbers 142 that identify associated regions on the map. Each region includes a color displayed to the user that is indicative of a soil condition. For example, a bright green color may indicate that the soil in a particular region has an appropriate amount of water while a brown color may indicate that a region is getting a less than desired amount of water. This region color determination may be based solely on data from soil moisture sensors within the region, a plurality of different sensor types, or by the soil simulation method described later in this specification. In addition to current information, the map area 130 can display projected future events, such as the amount of water that will be applied in an upcoming irrigation schedule.

The layout of the map regions, i.e. the geographic layout of the map, can be created in a map edit mode where the user draws regions representing the watering area, marks sprinklers within these regions, marks sensors locations, indicates pipes connecting to the sprinklers, and otherwise locates the position and configuration of other important irrigation equipment. An aerial photo of the watering area may be imported into the software to assist in creating an accurate representation. Additionally, positioning data, such as latitude and longitude coordinates may also be included for providing position-related software functionality, as described later in this specification. An accurate map of the watering area allows the irrigation software to provide more accurate information to the user and thus allows the user to better manage the irrigation system.

Alert Area

The alert area 134 displays recent activity in the irrigation system 100. In the example shown in FIG. 3, each activity notification includes an icon similar to those mentioned in the discussion of the map area 130, as well as a location description of the active object. The user can therefore keep track of recent activity in the irrigation system 100.

Such activity can be provided, at least in part, by the components of the irrigation system 100, such as the intelligent sprinkler 106 which provides feedback to the central computer 102 from the sensor components 112, seen in the diagram of FIG. 2. These sensor components 112 provide the central computer 102, and thus the irrigation software, with information such as the vertical position of the sprinkler head, the relative angular position of the nozzle, the speed of the nozzle rotation, if the sprinkler is watering, and if the sprinkler is consuming the appropriate current.

In another example, a satellite controller 104 according to the present invention includes a current sensor which can measure the current draw for each output irrigation station. With this sensor information, the irrigation software can limit the total current draw of a satellite controller 104 by reducing the number of sprinklers 106 that are activated at once for each satellite controller 104, thereby limiting the current draw to a preferred amount, such as 3.2 amps.

In this respect, the alert area 134 can provide customized alerts based on the sensor readings from the components of the irrigation system. In the present preferred embodiment, the alert area 134 provides an alert when a problem occurs with a sprinkler. In the case of a sprinkler 106, the alert area 134 may indicate a failure to rotate, a failure to popup, a failure to retract, and a communication failure.

Selector Area

The selector area 136 provides a filtering control that allows a user to view different irrigation system components on the map area 130. The example of FIG. 3 illustrates the selector area 136 set to show the components of the "Entire Course", which appear in a results list that indicates items such as greens, tees, fairways, and other objects. In this respect, the user can quickly search through and filter irrigation system objects to determine their status, history, or schedule.

Chart Area

The chart area 138 illustrates the past, present, and future events of the irrigation system 100 in a dynamic, linear chart. This chart area 138 can be adjusted to display certain types of events or events in specified areas. Preferably, the chart area 138 can display at least two main types of charts: a water chart and a calibration chart. The water chart displays information about all types of watering event, such as watering start and end times, nighttime watering events, daytime watering events, switches, hydraulic capacity, flow management sequencing, time, projected flow total, and actual flow total. The calibration chart displays data relating to the calibration of the irrigation cycles of the irrigation system. The calibration allows the user to increase or decrease the amount of water the irrigation software decides is appropriate for a given area. The calibration cart displays these values, showing the user where watering amounts have been manually increased.

Control Area

The control area 133 presents context-sensitive controls and information for an object that is selected in an area such as the selector area 136, map area 130, or chart area 138. Depending on the type of object selected, controls are presented on various tabs 146 that group the object controls based on a designated category. For example, a "Now" tab may contain controls for manual watering of an object, a "tonight" tab may show object controls specifying how much the selected object should water tonight, a "calibrate" tab may contain controls for increasing or decreasing the proportion that this object waters/is watered, and a "Details" tab may contain controls and information about properties of the selected object.

The control area 133 contains controls for a number of object types within the software, such as defined areas, ad hoc areas, sprinkler heads, virtual sprinkler heads, field control units, hydraulic system main lines, hydraulic system lateral lines, water sources, valves, timeline events, and switches, to name a few. Each object type includes a selection of controls unique to each object type, allowing the user to control various aspects unique to each object. For example, selecting a sprinkler may bring up a control to determine a watering window, calibration controls for that sprinkler, or a start time for that sprinkler.

Programmable Sprinkler Head GUI

Figure 4:
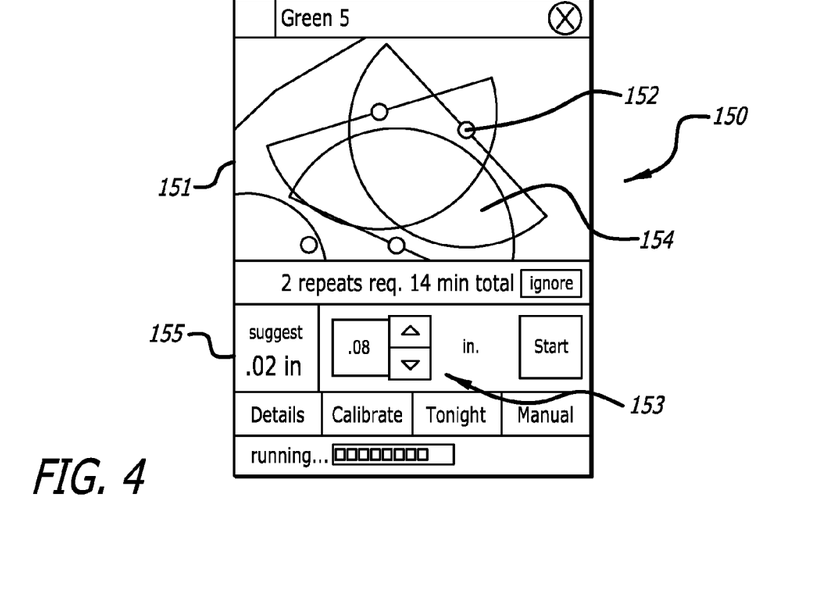
FIG. 4 illustrates another graphical user interface according to the present invention.
Figure 5:
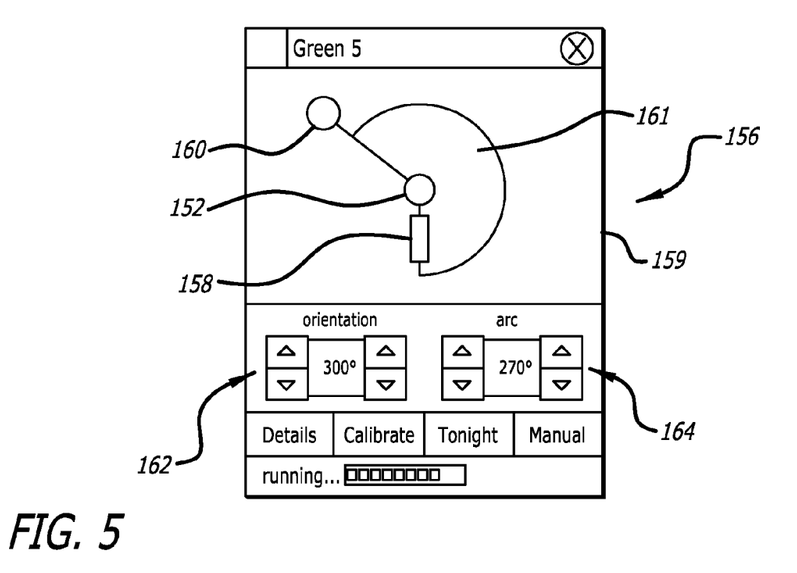
FIG. 5 illustrates another graphical user interface according to the present invention.
Figure 6:
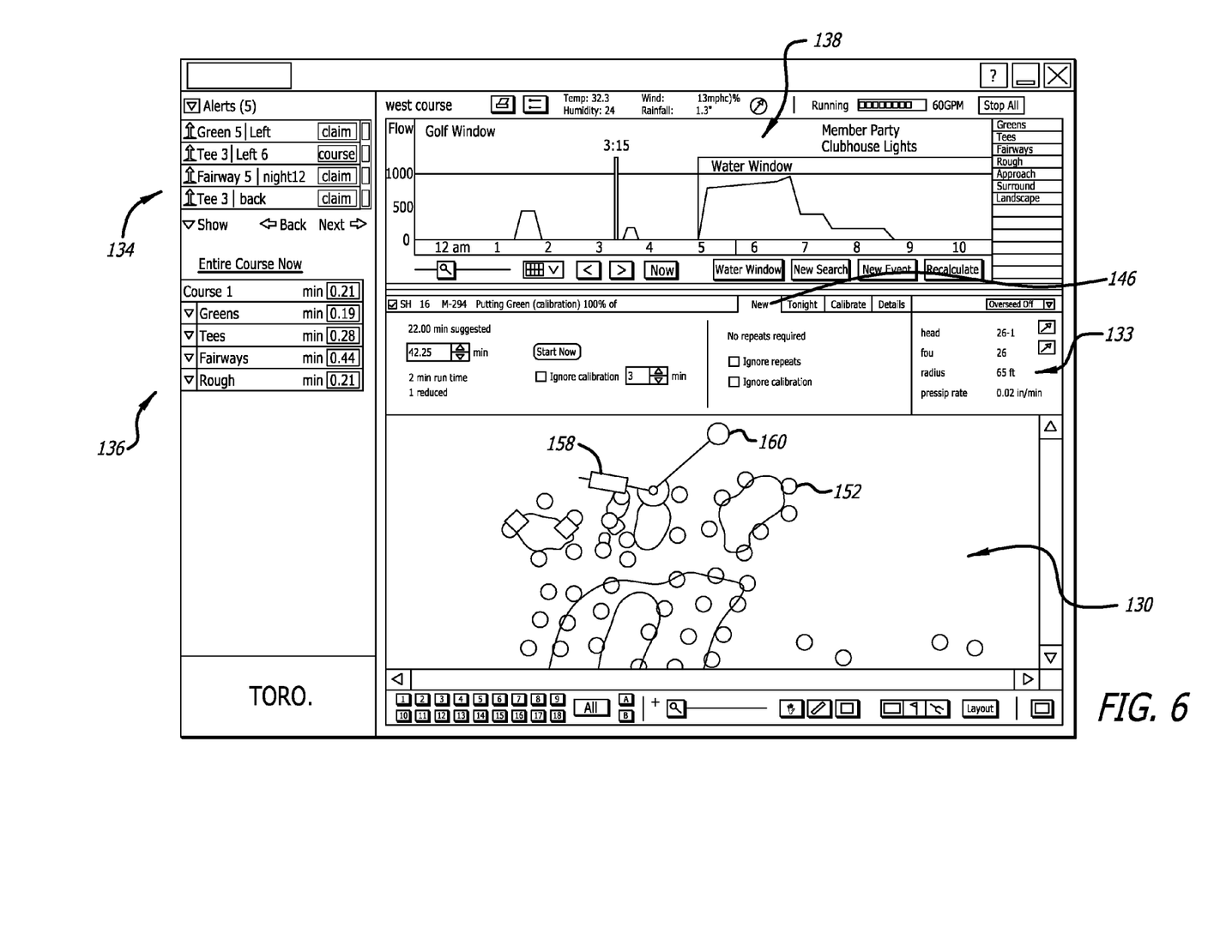
FIG. 6 illustrates another graphical user interface according to the present invention.

As seen in FIGS. 4-6, the irrigation software of the present invention controls the watering arc (i.e. the area watered by a sprinkler) and the amount of water distributed to that area. In this respect, the irrigation software, and therefore ultimately the user, can better determine water distribution for a watering area.

FIG. 4 illustrates an irrigation quantity graphical user interface 150 for determining the amount of water that should be distributed by a sprinkler 106. In the present example, a display window 151 shows icons 152 that represent sprinklers and a shaded arc 154 representing the area watered by the sprinkler.

Preferably, the color of shaded arc 154 varies from dark to transparent to communicate the visual water distribution volume that is or will be distributed from a particular sprinkler 106. A darker color of the shaded arc 154 may represent a higher volume of water distribution while a more transparent color may represent a relatively lower volume of water. Further, with the proper sprinkler information unique to different sprinkler heads and nozzle types, the irrigation software can display the variations of water distributions within the arc itself in the form of a densogram (displaying the density of the distributed water). For example, some sprinklers 106 distribute less water to the turf closest to the sprinkler 106 than further away. Data on the characteristic water distribution of a sprinkler 106 can be inputted into the irrigation software, allowing the software to display this distribution differential as variations in color within the arc, as seen in the example arc 154 of FIG. 4.

When an individual sprinkler 106 is selected, the irrigation software provides a suggested watering amount 155, provided here in inches. Such a watering amount suggestion 155 can be based on a number of factors, such as soil moisture sensor data, rain sensor data, temperature data, wind data, weather forecast data, or similar data used for such calculations as evapotranspiration or an optimal water distribution.

Preferably, as a user changes the watering arc for a specific sprinkler, the watering run time is automatically adjusted to maintain a desired watering amount of water. For example, when the user increases the watering arc size, the run time of the schedule for that sprinkler is increased. One example formula to calculate this changes is the New Runtime=(Area increased+Original Area)/(Original Area*Original Time). In another example, the run time of the sprinkler is decreased when the watering arc size is decreased. One example formula for calculating this change is the New Runtime=(Area Decreased/Original Area)*(Original Time).

Although the suggested watering amount 155 can be automatically implemented by the irrigation software, a manual watering amount 153 can also be designated by the user. This allows the user to further customize a specified irrigation schedule to achieve a desired water distribution.

As seen in FIG. 5, the irrigation software also includes an irrigation arc graphical user interface 156 that includes a main window 159 containing a sprinkler icon 152 with an adjacent watering arc display 161. The watering arc display 161, and thus the watering arc of the selected sprinkler 106, can be adjusted by moving an orientation handle 160 or an arc handle 158 to increase or decrease the angle at which the sprinkler nozzle stops during rotation. The orientation handle 160 represents a radial starting point for nozzle of the sprinkler 106 during irrigation while the arc handle 158 represents a radial stopping point for the nozzle, after which the nozzle rotation reverses back towards the orientation handle 160. The specific position of both handles 158 and 160 can be adjusted by clicking on the representations or entering in a value in boxes 162 or 164 respectively.

In addition to the water flow and watering arc, the irrigation software can show the actual nozzle position relative to the sprinkler body, due to feedback sensors of the preferred sprinkler 106. Additionally, as described in the previously incorporated U.S. Provisional Application 60/637,342, the sensors of the sprinkler 106 can sense the magnetic field of the Earth to determine the orientation of the sprinkler body. In this respect, the irrigation software can query the sprinkler 106 for different sensor data, then display it in an intuitive graphical format for the user. Thus, with the data of the sprinkler body orientation and the nozzle position relative to the sprinkler body position, the irrigation software can determine the absolute position (i.e. direction) of the sprinkler nozzle relative to the geography of the watering area. Further including geographical coordinate information (latitude and longitude coordinates) and the throw radius of the sprinkler 106 allows the irrigation software to illustrate the location, current nozzle direction, and possible water coverage area of the sprinkler. This information reduces the effort and complexity of determining an irrigation schedule while allowing the user to adjust the watering arc and water flow of each sprinkler 106 in real time.

It should be noted that the irrigation arc graphical user interface 156 and the irrigation quantity graphical user interface 150 can be integrated within the main user interface of the irrigation software as seen in FIG. 6, individual windows within the irrigation software, or even on a PDA as described later in this specification.

Virtual Sprinkler

The irrigation software of the present invention also allows each sprinkler 106 to execute multiple water coverage patterns at different times. In this respect, a single sprinkler 106 may be treated as multiple virtual sprinklers that can irrigate more than one area as part of different watering schedules.

Figure 7:
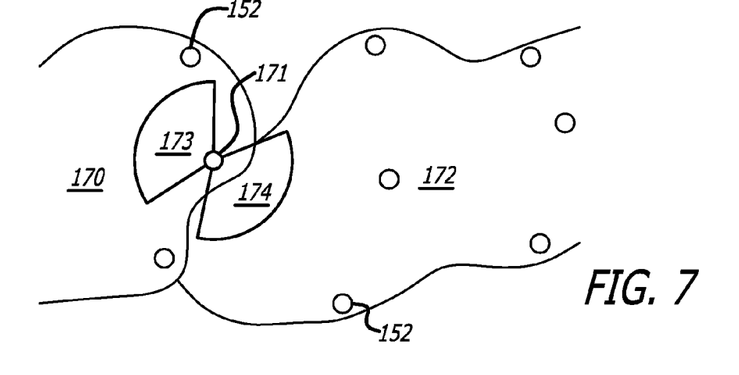
FIG. 7 illustrates another graphical user interface according to the present invention.

For example, FIG. 7 illustrates a display of the irrigation software showing a first watering area 170 and a second watering area 172 that each include a plurality of sprinkler icons 152 representing placement of the sprinklers 106 on the actual physical watering area. A virtual sprinkler 171 is located within the first watering area 170 which corresponds to a single physical sprinkler 106. However, the virtual sprinkler 171 includes a first watering arc 173 that is associated with the first watering area 170 and a second watering arc 174 that is associated with the second watering area 172. Therefore, when the irrigation software is scheduled to water the first watering area 170, the virtual sprinkler 171 causes the physical sprinkler 106 to water according to arc 173. Conversely, when the irrigation software activates a watering schedule for the second watering area 172, the virtual sprinkler 171 directs the physical sprinkler 106 to water according to arc 174. In this respect, the virtual sprinkler 171 can act in accord with the watering schedules for multiple watering areas, in effect acting as multiple sprinklers 106. Alternately, a virtual head may be used to create a temporary watering arc within a watering area to address a small area of turf that requires more water than its adjacent area.

Watering Methods

Since the irrigation software of the present invention preferably interacts with sprinklers 106 that have additional functional over typical irrigation sprinklers, additional watering methods can be employed to more effectively distribute water to a watering area. Previously, such functionality was impractical or even impossible with convention sprinklers and irrigation controllers.

For example, the present irrigation software can ensure that an even amount of water is distributed by each sprinkler for each irrigation cycle. Convention sprinklers move within a predefined watering arc for a period of time determined by an irrigation controller. When the irrigation controller ceases irrigation, the convention sprinklers almost immediately stop irrigation in whatever position of the watering arc that it happens to be at. This can lead to a fraction of the watering arc area that receives more water and thus can lead to over-watering or at least uneven turf growth.

To prevent this uneven watering, the irrigation software can adjust the rotational speed of the sprinkler nozzle to complete an even number of sweeps through a specified watering time. For example, with a full circle arc setting, the rotational speed of the sprinkler nozzle may be 2.5 rpm when the runtime is set to 5 minutes. Thus, irrigation is stopped only after a full arc sweep has occurred and just before the next arc sweep begins.

In another example of new watering functionality of the present invention, the irrigation software can adjust the precipitation rate or the rate water is applied to an area of the surrounding turf by adjusting the rotation speed of the sprinkler nozzle. If too much water is applied to quickly to an area of turf, the water application rate can exceed the water infiltration rate of the turf, which can lead to runoff of excess water. The irrigation software can be programmed with or estimate the turf's water infiltration rate then adjust the rotational speed of the sprinkler nozzle to adjust the water application rate accordingly. As the rotation of the sprinkler nozzle increases in speed the water application rate decrease, while a decrease in the rotation speed of the sprinkler nozzle increases the water application speed. In this respect, the irrigation software can determine and deliver the most water to the turf without causing wasted runoff that otherwise bypasses the intended watering area.

In another example of new watering functionality of the present invention, the irrigation software can increase or decrease the radius of water throw by adjusting the rotational speed of the sprinkler nozzle. If the user desires to decrease the radius of the water flow, the rotational speed of the sprinkler nozzle is increased by the irrigation software during an irrigation cycle. Similarly, if the user desires to increase the radius of the water flow, the rotation speed of the sprinkler nozzle is decreased by the irrigation software.

Automatic Irrigation Coverage Based on Water Needs Contour

The irrigation software of the present invention preferably includes a feature that automatically waters areas of turf that are calculated to require water. This feature can be especially useful suggesting an overall watering schedule and in preventing specific smaller areas of turf that otherwise might not get enough water from wilting.

The irrigation software of the present invention simulates soil moisture values of the turf by considering numerous soil moisture factors such as evapotranspiration, shade, turf growth cycle, soil type, turf geography (e.g. slope), soil moisture sensor readings, rain fall, temperature, weather (e.g. cloudy days or sunny days) and other similar factors. If the irrigation software determines that the amount of water in the soil could be insufficient or low, the software will automatically create a highly localized irrigation schedule to increase soil moisture at only the areas in need.

The irrigation software categorizes turf areas according to four water need categories that range from very moist to very dry: Field Capacity, Acceptable Range, Risk, and Wilt Point. Preferably, the irrigation software only takes action with moisture levels other than Acceptable Range (a range acceptable to turf growth), such as scheduling an extra watering cycle for an area categorized as Risk or Wilt Point, or partially eliminating an irrigation cycle for an area categorized as Field Capacity.

Figure 11:
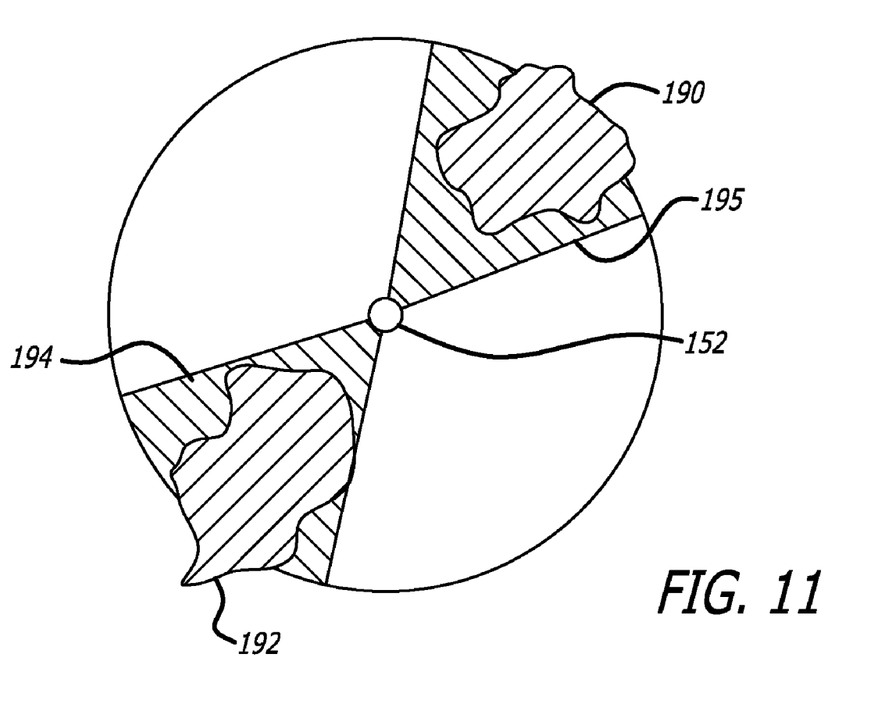
FIG. 11 illustrates another graphical user interface according to the present invention.

As shown in the software display of FIG. 11, the irrigation software has determined that the moisture level of area 190 likely falls into the Risk category, meaning that the turf in that area is at risk to be damaged due to a lack of water. The irrigation software then creates an additional irrigation schedule for the sprinkler 106 nearest to that area, represented by icon 152. As part of this new irrigation schedule, the irrigation software calculates the smallest watering arc possible, such as watering arc 195, so as to only distribute water to the dry area. The irrigation software also determines the appropriate amount of extra water needed to restore the soil moisture to a desired level and schedules the duration and frequency accordingly. In some cases, such extra irrigation cycles may be temporary, and in other cases these cycles may be continually ongoing.

In some situations, an area of turf may receive too much water. When the irrigation software calculates such a problem, the area is categorized as Field Capacity, such as area 192 in FIG. 11. Next, the irrigation software calculates the appropriate amount of water that should be prevented from watering that area, determines a watering arc size that best fits that area, such as arc 194, and then prevents this area from being watered during upcoming irrigation schedules. In some situations, the unwatered arc area, such as area 194, may be temporary, and in other situations may be continually ongoing.

In addition to calculating and compensating for smaller, problem areas, the above-described moisture need/content calculations by the irrigation software can be used to suggest and automatically implement a watering schedule appropriate to all of the designated watering areas of the irrigation. In this respect, the irrigation software calculates the water need for each watering area (e.g. watering area 142 in FIG. 3), determines the runtimes, watering arcs, and other watering aspects for each sprinkler, and then creates an appropriate watering schedule. However, this automatic watering suggestion can be manually adjusted by the user to tweak an automatic schedule or even radically revise a schedule according to the user's preference.

When determining a suggested irrigation schedule for a larger watering area (e.g. watering area 142 in FIG. 3), the irrigation software first determines or references a preset moisture value that is desired for that watering area. Next, the irrigation software determines an actual or probably current moisture value of the soil for the watering area. The irrigation software then calculates a minimum amount of water needed to be delivered to the watering area. Finally, for each sprinkler 106 within the watering area, the irrigation software determines the smallest watering arc size that still covers the desired watering area. With sprinklers 106 near the center of a watering area, this will most likely be a full circle arc setting. However, with sprinkler 106 near the edges of the watering area, this will likely be a partial watering. By adjusting the watering arcs to only the size actually needed to cover the target watering area, the irrigation software can more efficiently distribute water to only the areas in need.

Further, the automatic watering suggestion can be calibrated by user input to better tailor the suggestions to the actual needs of the turf area. Such calibration occurs when the user adjusts different aspects of an automatic watering schedule. The irrigation software stores these changes in memory and references them when creating future irrigation schedules. In this respect, the suggested irrigation schedule will become better calibrated for providing an amount of water appropriate for the specific watering area.

Optimized Flow Using Looped Hydraulic Simulation

In addition to sprinklers, satellite controllers and other objects, the irrigation software allows the water piping that supplies the sprinklers 106 with water to be entered into the software for use with a hydraulic simulation. When accurate pipe data is entered, the irrigation software optimizes hydraulic flow by activating the maximum number sprinklers 106 without causing water pressure related performance problems.

Figure 10:
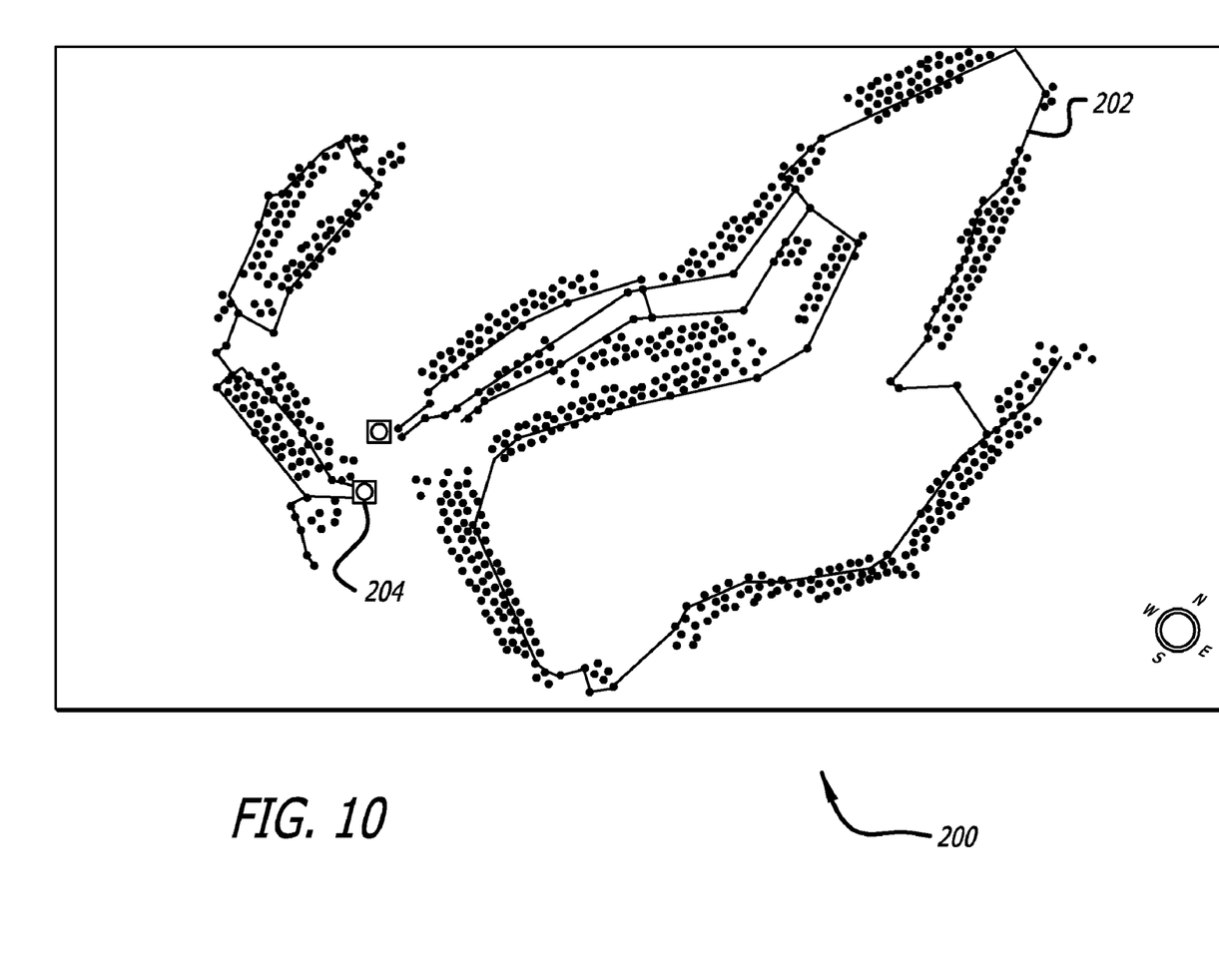
FIG. 10 illustrates another graphical user interface according to the present invention.

FIG. 10 illustrates a hydraulic map view 200 which illustrates the location of various main hydraulic lines 202 positioned through the course. Each main hydraulic line 202 ultimately connects to a water source 204, sometimes creating multiple loops to enhance performance.

The hydraulic simulation creates a simulation based, in part, on the relative position of the sprinklers from the water source, the number of turns in the hydraulic lines, the incline or decline PDA User Interface The irrigation software according to a preferred embodiment of the present invention provides a user interface at not only the central computer 102 but through a wireless mobile PDA. By providing an interface to the irrigation software by a wireless network connection via the PDA, the user can interact and operate with the irrigation software anywhere on the turf or even at a remote location with an internet connection.

Preferably, the PDA includes remote irrigation software that can communication and interact with the irrigation software on the central computer 102 by a wireless connection (e.g. 802.11 WiFi) to an intranet or by a wireless internet service provider (e.g. the EvDO service offered by Verizon Wireless) through the internet. Alternatively, the remote irrigation software can be located on the central computer 102 which provides a software interface in a web accessible format such as HTML, allowing a user to interact with the irrigation software on the main computer via a web browser on a PDA.

The PDA software preferably includes all of the control options provided in the irrigation software on the central computer 102, but adapted to be displayed on the smaller screen of the PDA. Examples of such adaptations can be seen in the quantity control graphical user interface 150 of FIG. 4, the irrigation arc graphical user interface 156 of FIG. 5, the map area interface 180 of FIG. 8, and the alert area 186 of FIG. 9.

Figure 8:
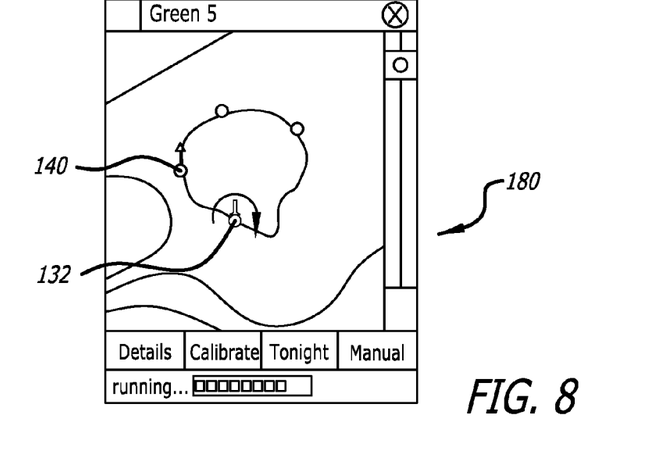
FIG. 8 illustrates another graphical user interface according to the present invention.
Figure 9:
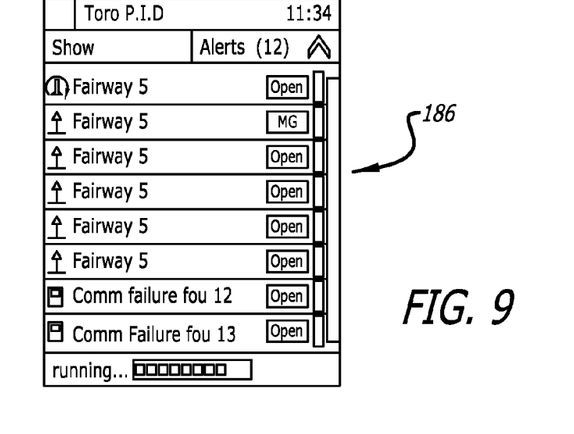
FIG. 9 illustrates another graphical user interface according to the present invention.

Preferably, the PDA includes the ability to determine its location on the watering area and provide location-based software functionality. For example, the user's position is displayed when the watering area is shown, such as in the map area interface 180. Further, a zoomed-in view of the watering area automatically follows the position of the user to show relevant objects in close proximity to the user.

Additionally, as the user moves within a predetermined proximity to an object, the PDA software automatically presents the user with control options for that object, as described elsewhere in this specification. For example, when the user moves to within 10 feet of a sprinkler 106, the PDA software automatically presents the irrigation arc GUI 156 on the PDA to facilitate expected changes to the operation of the sprinkler 106.

In another aspect of the present invention, an irrigation cycle can be temporarily disabled when the location of the user is within an area currently being watered. This prevents the user from getting wet while traveling through such an area. It should be noted that this proximity-based irrigation disabling can be used with a non-PDA device dedicated for this purpose. This allows such functionality to be incorporated into maintenance vehicles, golf carts, articles worn by workers or guests, and other similar uses.

The position of the PDA or other location device may be determined by a global position system (GPS) receiver based on GPS satellite signals as known in the art. Alternatively, positioning can be determined by triangulating the PDA position based on the signal strengths of at least two wireless communications transceivers, as described in U.S. Pat. Nos. 6,694,142; 4,926,161; and 6,826,162; the contents each of which are hereby incorporated by reference.

Plug and Play

A preferred embodiment of the present invention also includes "plug and play" functionality which allows the irrigation software to automatically recognize the object (such as a sprinkler or sensor) that has been connected to the irrigation network. The irrigation software can further automatically determine the objects functionality (e.g. a sprinkler with motorized arc control) and display relevant control features within in the software.

Preferably, when a device is attached to the irrigation network, the irrigation software transmits a message to discover what device type is attached and how that device should be configured. For example, if a satellite with 2 sensors and 56 irrigation stations is attached to the network, the satellite would send a ping during boot up on the network letting the irrigation software know that the new device is attached. The irrigation software then communicates a message to the satellite for a description of the device and its configuration.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method of controlling a pop-up rotary sprinkler of an irrigation system comprising:
    providing a computer in communication with a sprinkler;
    executing an irrigation control program on said computer; said irrigation control program further comprising a graphical user interface;
    receiving soil moisture data for an area of turf with said irrigation control program;
    determining with said irrigation control program an area of turf that requires water based on said soil moisture data;
    determining with said irrigation control program a watering arc sized to fit only said area of turf that requires water;
    determining watering arc control data for said pop-up rotary sprinkler;
    communicating said watering arc control data to said sprinkler;
    watering an area adjacent to said sprinkler based on said watering arc control data.

2. The method of claim 1, wherein said determining watering arc control data for said pop-up rotary sprinkler further comprises determining a first absolute arc stop position and determining a second absolute arc stop position.

3. The method of claim 2, wherein said determining watering arc control data for said pop-up rotary sprinkler further comprises determining a sprinkler rotation speed.

4. The method of claim 1, wherein said determining watering arc control data for said pop-up rotary sprinkler further comprises determining a sprinkler rotation speed.

5. The method of claim 1, wherein said executing an irrigation control program on said computer further comprises displaying a graphical representation of said sprinkler.

6. The method of claim 1, wherein said executing an irrigation control program on said computer further comprises displaying a graphical representation of said watering area.

7. The method of claim 1, wherein said determining watering arc control data for said pop-up rotary sprinkler further comprises automatically suggesting an amount of water to distribute during a predetermined time.

8. The method of claim 7, wherein said suggesting an amount of water to distribute during a predetermined time further comprises calculating a rotation speed of a sprinkler head of said sprinkler.

9. The method of claim 1, said executing an irrigation control program on said computer is followed by obtaining feedback data from said sprinkler.

10. A method of controlling a pop-up rotary sprinkler of an irrigation system comprising:
providing a computer in communication with a sprinkler;
executing an irrigation control program on said computer;
communicating sensor data to said irrigation control program;
displaying said sensor data with a graphical user interface; said sensor data comprising a vertical height of a sprinkler riser of said pop-up rotary sprinkler;
operating said graphical user interface to produce control data for said sprinkler;
communicating said control data to a controller of said sprinkler;
watering an area adjacent to said sprinkler based on said control data.

11. The method of claim 10, wherein said communicating sensor data to said irrigation control program further comprises communicating a nozzle position of said sprinkler.

12. The method of claim 11, wherein said communicating a nozzle position of said sprinkler further comprises communicating an absolute position of said nozzle.

13. The method of claim 11, wherein said communicating a nozzle position of said sprinkler further comprises determining an absolute position of a body of said sprinkler and determining a relative position of said nozzle relative to said body of said sprinkler.

14. The method of claim 10, wherein said communicating sensor data to said irrigation control program further comprises communicating if said sprinkler riser is in a popped up or retracted position.

15. The method of claim 10, wherein said communicating sensor data from said sprinkler to said irrigation control program is followed by communicating a soil moisture sensor data to said irrigation control program.

16. The method of claim 15, wherein said displaying said sensor data with a graphical user interface further comprises calculating a moisture need for said area adjacent said sprinkler and displaying said moisture need on said graphical user interface.

17. A method of determining a watering area of a pop-up rotary sprinkler with an irrigation software comprising:
selecting an absolute position of a first arc limit of said sprinkler with said irrigation software;
selecting an absolute position of a second arc limit of said sprinkler with said irrigation software;
communicating said first arc limit and said second arc limit to said sprinkler; and
activating said sprinkler to water said watering area according said first arc limit and said second arc limit
receiving sensor data from at least one sprinkler; said sensor data comprising a vertical height of a nozzle.

18. The method of claim 17, wherein said selecting an absolute position of a first arc limit of said sprinkler with irrigation software further comprises operating a graphical user interface.

19. The method of claim 17, wherein said activating said sprinkler to water said watering area according said first arc limit and said second arc limit further comprises calculating a speed of rotation of said sprinkler to cause said sprinkler to only water a whole number of passes within said first arc limit and said second arc limit.

20. The method of claim 17, wherein said activating said sprinkler to water said watering area according said first arc limit and said second arc limit further comprises:
determining a desired moisture value of an area near said sprinkler with said irrigation software;
determining a moisture value of said area near said sprinkler with said irrigation software;
determining a minimum watering arc for said sprinkler needed to irrigate said area near said sprinkler with said irrigation software; and
determining a minimum amount of water for said sprinkler needed to adjust said moisture value to said desired moisture value with said irrigation software.

* * * * *